United States Patent [19]
Matsuura et al.

[11] Patent Number: 5,295,738
[45] Date of Patent: Mar. 22, 1994

[54] ANTI-SKID CONTROL SYSTEM FOR MOTOR VEHICLE

[75] Inventors: Masahiro Matsuura; Shouichi Masaki; Masashi Kishimoto, all of Chiryu; Tatsuo Sugitani, Mishima, all of Japan

[73] Assignees: Nippondenso Co., Ltd., Kariya; Toyota Jidosha Kabushiki Kaisha, Toyota, both of Japan

[21] Appl. No.: 886,287

[22] Filed: May 21, 1992

[30] Foreign Application Priority Data

May 23, 1991 [JP] Japan .................................. 3-118642

[51] Int. Cl.⁵ ............................................... B60T 8/32
[52] U.S. Cl. .................... 303/100; 364/426.02
[58] Field of Search ............... 303/100, 102, 103, 105, 303/106, 108, 109, 110; 364/426.02, 426.03

[56] References Cited
U.S. PATENT DOCUMENTS 4,919,494  4/1990  Higashimata et al. .......... 303/102 X
4,969,102 11/1990  Tamura et al. .................. 303/102 X
5,082,333  1/1992  Fukushima et al. ............. 303/103 X
5,116,108  5/1992  Sigl et al. ........................ 303/110 X

FOREIGN PATENT DOCUMENTS 1-182155  7/1989  Japan .
3-50059   3/1991  Japan .

Primary Examiner—Robert J. Oberleitner
Assistant Examiner—Kevin D. Rutherford
Attorney, Agent, or Firm—Cushman, Darby & Cushman

[57] ABSTRACT

An anti-skid control system for use in a motor vehicle which controls a braking pressure for a wheel of the motor vehicle to keep a slip of the wheel to an appropriate state by alternately performing a pressure-increasing operation and a pressure-maintaining operation in accordance with a slipping state of the wheel. The system first detects a slipping state of the wheel before performing the pressure-increasing operation on the basis of a vehicle speed and a wheel speed and then detects a slipping state of the wheel when a predetermined time period is elapsed from the pressure-increasing operation in a state that the braking pressure is maintained after the completion of the pressure-increasing operation so as to calculate a variation of the slipping state of the wheel on the basis of the detection results. Further, the system adjusts the ratio of a time period for the pressure-increasing operation to a time period for the pressure-maintaining operation so that the ratio becomes smaller as the variation of the slipping state becomes greater. This arrangement allows the wheel slipping state to be accurately detected without including errors due to the braking pressure increasing operation, thereby quickly increasing the braking pressure to an appropriate value.

5 Claims, 8 Drawing Sheets

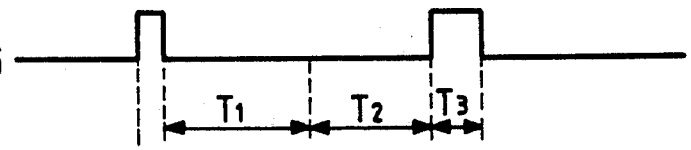
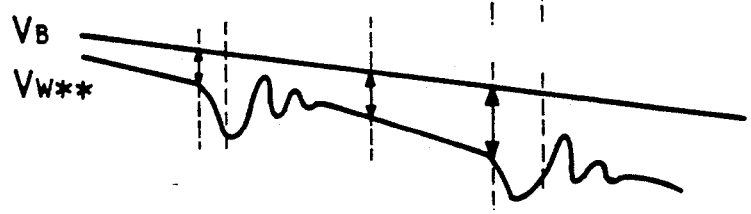
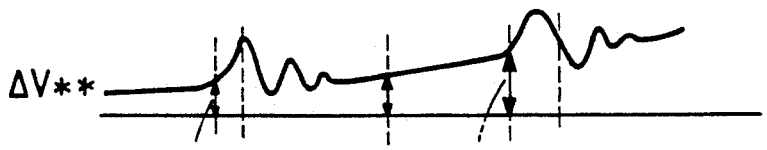
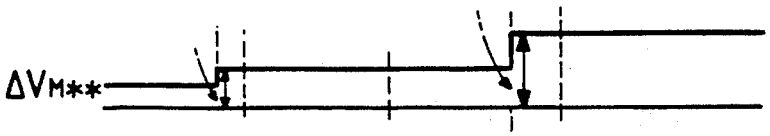
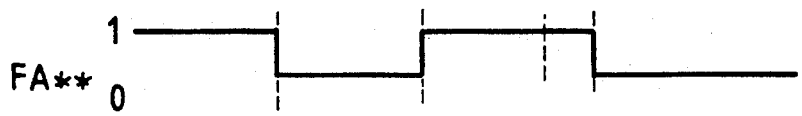
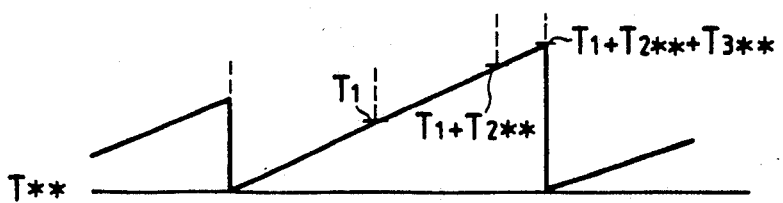

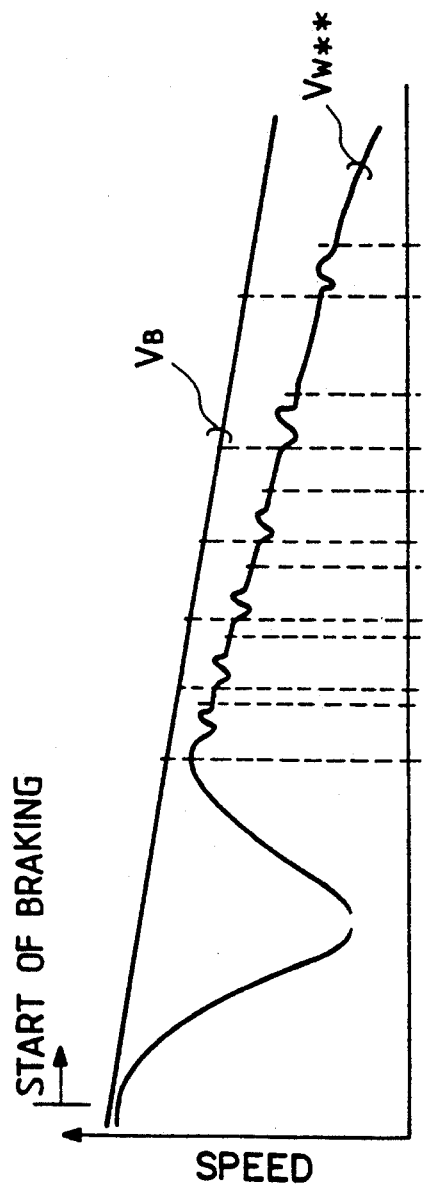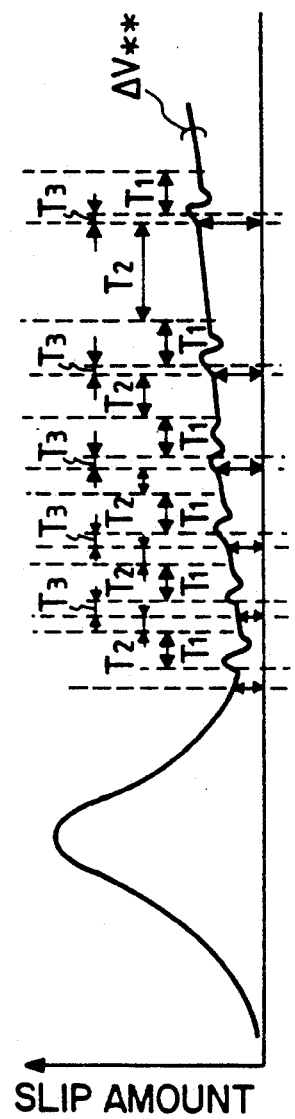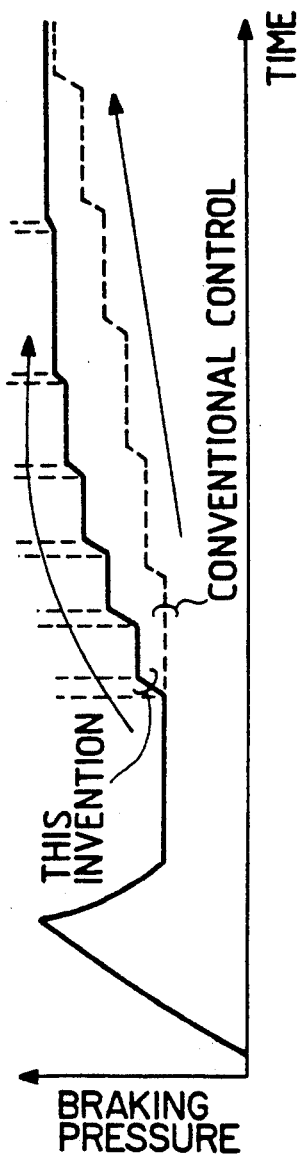
FIG. 9 (a)
FIG. 9 (b)
FIG. 9 (c)

ANTI-SKID CONTROL SYSTEM FOR MOTOR VEHICLE

BACKGROUND OF THE INVENTION

The present invention relates to an anti-skid control system for use in a motor vehicle, and more particularly to such an anti-skid control system for continuously controlling the grade (gradient) of the braking pressure for a wheel of the motor vehicle in accordance with variation of a slipping state of the wheel.

A conventional anti-skid control system is arranged such that a wheel speed and a wheel acceleration are respectively compared with a plurality of reference speeds and a plurality of reference accelerations so as to control the braking pressure for a wheel on the basis of the comparison results in accordance with predetermined pressure-increasing patterns or pressure-decreasing patterns. However, in the case of controlling the braking pressure in accordance with the predetermined fixed pressure-controlling pattern, difficulty is encountered to effect a braking control operation adequately coping with the slipping state of the wheel, thereby deteriorating the braking efficiency.

One possible solution is, as disclosed in the Japanese Patent Provisional Publication No. 1-182155, to continuously change the pressure-increasing or pressure-decreasing grade through the duty control of the wheel braking pressure in which the duty ratio is determined in accordance with the slip ratio of the wheel and the time variation of the slip ratio. According to this conventional anti-skid control system, since in addition to the wheel slip ratio the time variation of the slip ratio is also used as a braking pressure control parameter, when the wheel slip ratio varies, the duty ratio can be changed in accordance with the slip ratio variation, thus preventing the wheel slip ratio from being greatly deviated from a target value. Here, for example, in the case of increasing the wheel braking pressure, the conventional anti-skid control system is arranged to alternately effect the pressure-increasing and pressure-maintaining operations in accordance with the duty ratio determined by the wheel slip ratio and the time variation of the slip ratio. When the wheel braking pressure is switched from the maintaining state to the increasing state, vibration of the wheel and the like occur due to the variation of the braking pressure. The occurrence of the wheel vibration causes variation of the wheel speed whereby errors appear in the slip ratio and the slip ratio time variation to be obtained on the basis of the wheel speed. If determining the duty ratio on the basis of the slip ratio and slip ratio time variation includes the errors, difficulty is encountered to adequately keep the slipping state of the wheel.

SUMMARY OF THE INVENTION

It is therefore an object of the present invention to provide an anti-skid control system which is capable of adequately controlling the braking pressure by detecting a wheel slipping state in which error is reduced and by controlling the grade of the braking pressure in accordance with the wheel slipping state.

One feature of this invention, which is based on the fact that the variation of the slipping state of the wheel relative to the increase in the braking pressure for the wheel becomes greater as the slipping state of the wheel is closer to an appropriate state, is to decrease the variation of the braking pressure by reducing the ratio of the increasing of the braking pressure to the maintaining of the braking pressure as the variation of the wheel slipping state becomes greater. In addition, the detection of the wheel slipping state is arranged to be made when a predetermined time is elapsed from the completion of the increasing of the braking pressure, thereby accurately detecting the wheel slipping state without including errors due to the pressure-increasing operation.

According to this invention, first detecting means detects a slipping state of the wheel before performing the pressure-increasing operation on the basis of the detected vehicle speed and the detected wheel speed and second detecting means detects a slipping state of the wheel when a predetermined time period is elapsed from the pressure-increasing operation in a state that the braking pressure is maintained after the completion of the pressure-increasing operation. Calculation means calculates a variation of the slipping state of the wheel on the basis of the detection results of the first and second detecting means and adjusting means adjusts a ratio of a time period for the pressure-increasing operation to a time period for the pressure-maintaining operation so that the ratio becomes smaller as the variation of the slipping state calculated by the calculation means becomes greater. According to the adjustment result by the adjusting means, pressure-increasing means alternately performs the pressure-increasing operation and the pressure-maintaining operation so as to increase the braking pressure for said wheel.

BRIEF DESCRIPTION OF THE DRAWINGS

The object and features of the present invention will become more readily apparent from the following detailed description of the preferred embodiments taken in conjunction with the accompanying drawings in which:

FIGS. 8a–8f, 9a–9c, 10a–10c are graphic illustrations describing the anti-skid control operation according to the embodiment.

DETAILED DESCRIPTION OF THE INVENTION

Figure 1:
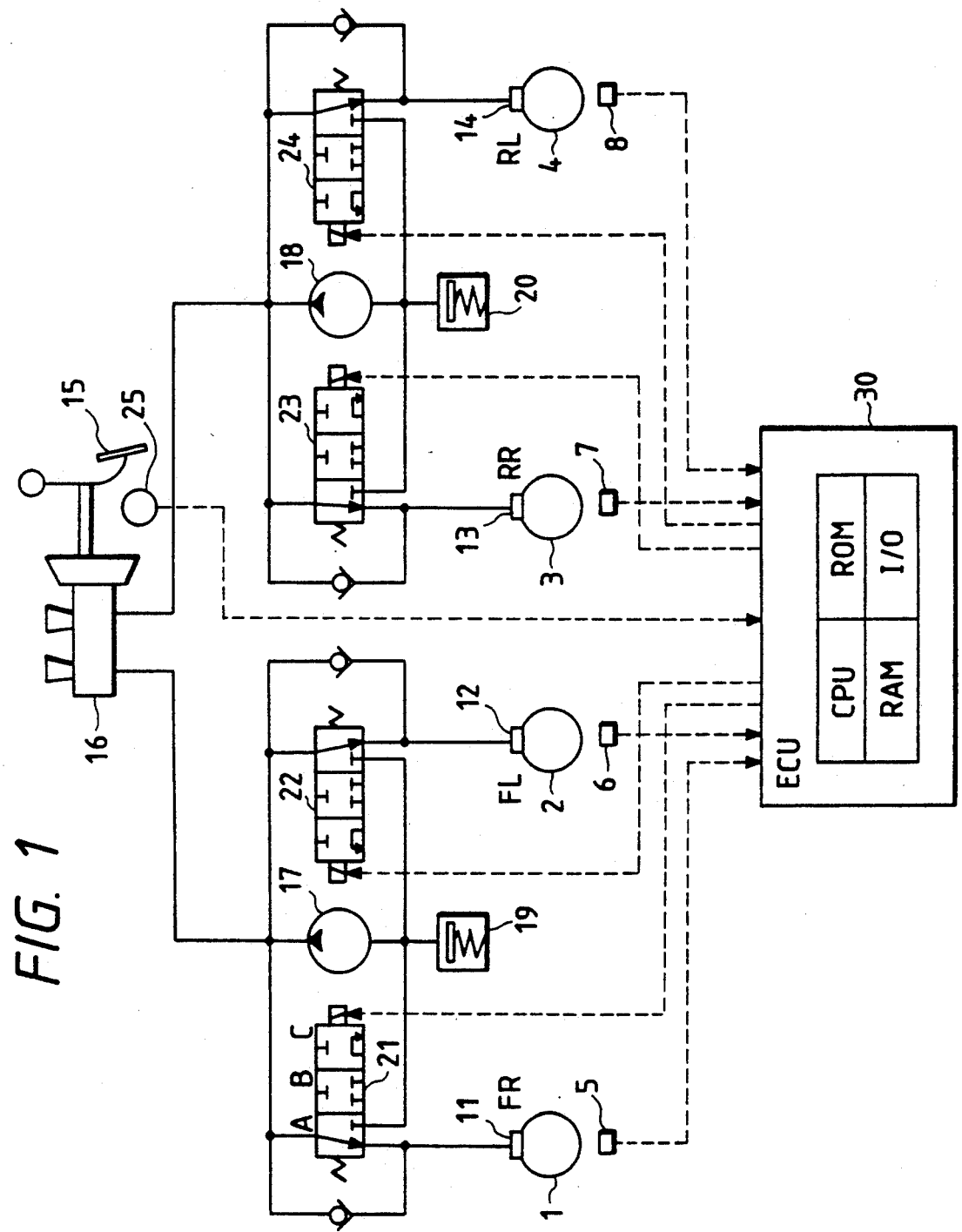
FIG. 1 shows an arrangement of an anti-skid control system according to an embodiment of the present invention.

FIG. 1 is an illustration of an arrangement of an anti-skid control system according to an embodiment of the present invention which is incorporated in a motor vehicle. In FIG. 1, for a front-right wheel 1, a front-left wheel 2, rear-right wheel 3 and a rear-left wheel 4 of the motor vehicle there are provided electromagnetic pickup type or magnetic resistance element (MRE) type wheel speed sensors 5, 6, 7 and 8 each of which outputs a pulse signal in response to revolution of each of the respective wheels 1 to 4. Further, for the respective wheels 1 to 4 there are provided hydraulic pressure braking devices (wheel cylinders) 11 to 14 to which a hydraulic pressure from a master cylinder 16 is supplied through actuators 21 to 24 and hydraulic pressure passages. A depressing state of a braking pedal 15 of the motor vehicle is detectable by means of a stop switch 25 which is arranged to output an ON signal in braking and output an OFF signal in non-braking. In the normal state, the depression of the braking pedal 15 generates a hydraulic pressure in the master cylinder 16 to brake the respective wheels 1 to 4. On the other hand, for the slip control there are additionally provided motor-driven hydraulic pumps each of which acts as a hydraulic pressure source to suck a braking liquid from each of reservoirs 19, 20 to generate a hydraulic pressure.

Designated at numeral 30 is an electronic control unit (ECU) which controls the actuators 21 to 24 to adjust the braking hydraulic pressures to the wheel cylinders 11 to 14 to adjust the braking forces for the respective wheels 1 to 4. Each of the actuators 21 to 24 comprises an electromagnetic type 3-position value having a pressure-increasing position, a pressure-decreasing position and a pressure-maintaining position. For example, in the case of the actuator 21, the braking hydraulic pressure is increased when taking the position indicated by character A, maintained when taking the position denoted by character B, and escaped to the reservoir 19 to be decreased when taking the position designated by character C. Further, this 3-position valve takes the pressure-increasing mode when being in the non-energized state and assumes the pressure-maintaining or pressure-decreasing mode in accordance with the level of the energized current supplied thereto.

The ECU 30 is constructed with a microcomputer including a CPU, a ROM, a RAM and an input/output (I/O) port. The ECU 30 receives a power from a power source in response to the turning-on of an ignition switch of the motor vehicle and inputs the signals from the speed sensors 5 to 8 and the stop switch 25 to perform the calculation operation for the anti-skid control. Further, the ECU 30 generates control signals on the basis of the calculation results to output them to the actuators 21 to 24.

Figure 2:
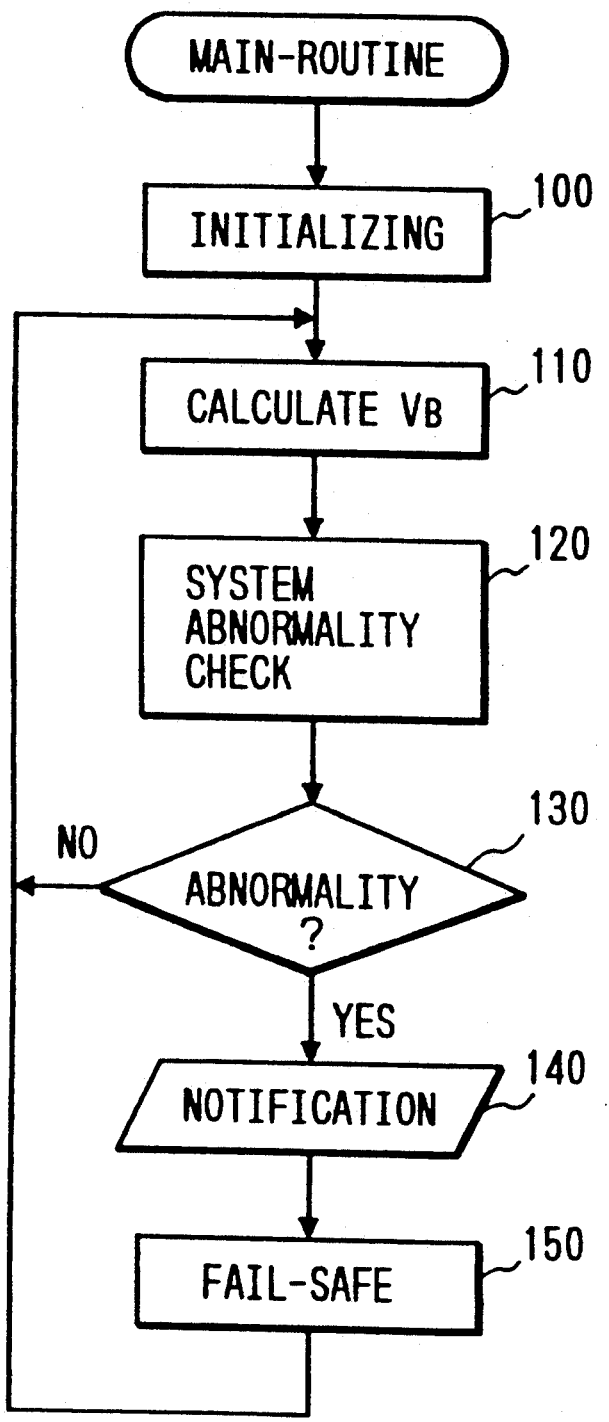
FIG. 2 is a flow chart showing a main routine to be executed in the anti-skid control system according to this embodiment.

Secondly, a control operation of the ECU 30 will be described hereinbelow with reference to a flow chart of FIG. 2 which is a main control routine to be executed in response to the turning-on of the ignition switch. In FIG. 2, the control starts with a step 100 to perform an initializing operation. Here, the initializing operation includes processes for clearing various variable of the RAM (random access memory) and the contents of counters and processes for resetting flags. After the initialization, operations from a step 110 to a step 150 are repeatedly effected. The step 110 is for calculating an estimation vehicle speed $V_B$ which is determined to be the intermediate value of the maximum value of the wheel speeds and limit speeds. The maximum wheel speed value is the maximum value of the speeds Vw of the wheels 1 to 4 to be calculated in a step 200 in an interruption operation (which will be described hereinafter). Here, the subscript  represents the wheels, that is, the speed of the front-right (FR) wheel 1 is designated at VwFR, the speed of the front-left (FL) wheel 2 is expressed as VwFL, the speed of the rear-right (RR) wheel 3 is indicated by VwRR, and the speed of the rear-left (RL) wheel 4 is denoted as VwRL. Further, the limit speeds are values obtained by taking into account the upper limit of the vehicle accelerations and the upper limit of the vehicle decelerations, which can be taken in the actual vehicle-running states, with respect to the previous estimation vehicle speed calculated in the previous estimation vehicle speed calculation operation. For example, the estimation vehicle speed $V_B$ varies as shown in (a) of FIG. 9 when braking the motor vehicle.

Subsequently, the step 120 follows in order to check an abnormality of the system. In this operation the data corresponding to the normal operating states of the system elements prestored in the ROM (read-only memory) is compared with the data indicative of the operating states of the system elements derived in the current operation. If the decision is made such that the system abnormality occurs, an abnormality flag is set which is indicative of the system abnormality state. If the decision is made such that the system abnormality does not occur, the abnormality flag is reset. The step 130 is for determining the system abnormality in accordance with the state of the abnormality flag. If the abnormality flag is not set, that is, when the system is normally operating, the control returns to the estimation vehicle speed VB calculation step 110. On the other hand, if set, that is, the system abnormality occurs or the system is abnormally operating, the control advances to the steps 140 and 150, thereafter again returning to the step 110.

The step 140 is provided in order to inform the operator that the system abnormality occurs and for confirming that the anti-skid control is not effective. Here, an indicator lamp (not shown) is turned on when the decision of the step 120 is made such that the system abnormality occurs. Further, the step 150 is for performing the fail-safe operation in the case of the system abnormality. In the step 150 the ECU 30 outputs control signals to thereby cut the energizations of the pressure control electromagnetic solenoids of the four actuators 21 to 24.

Figure 3:
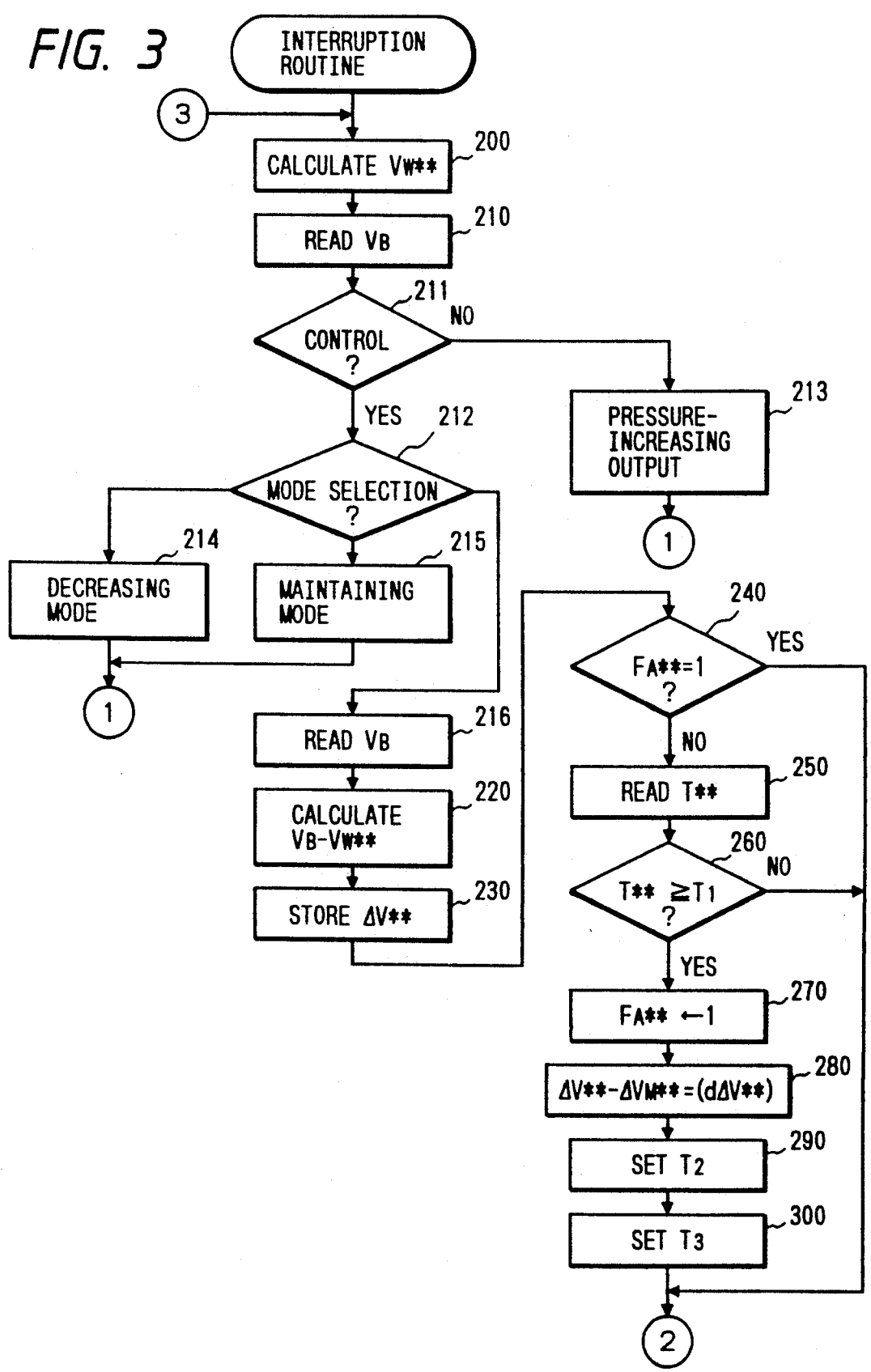
FIGS. 3 and 4 are flow charts showing an interruption routine to be executed for the anti-skid control by an anti-skid control system according to this embodiment.
Figure 4:
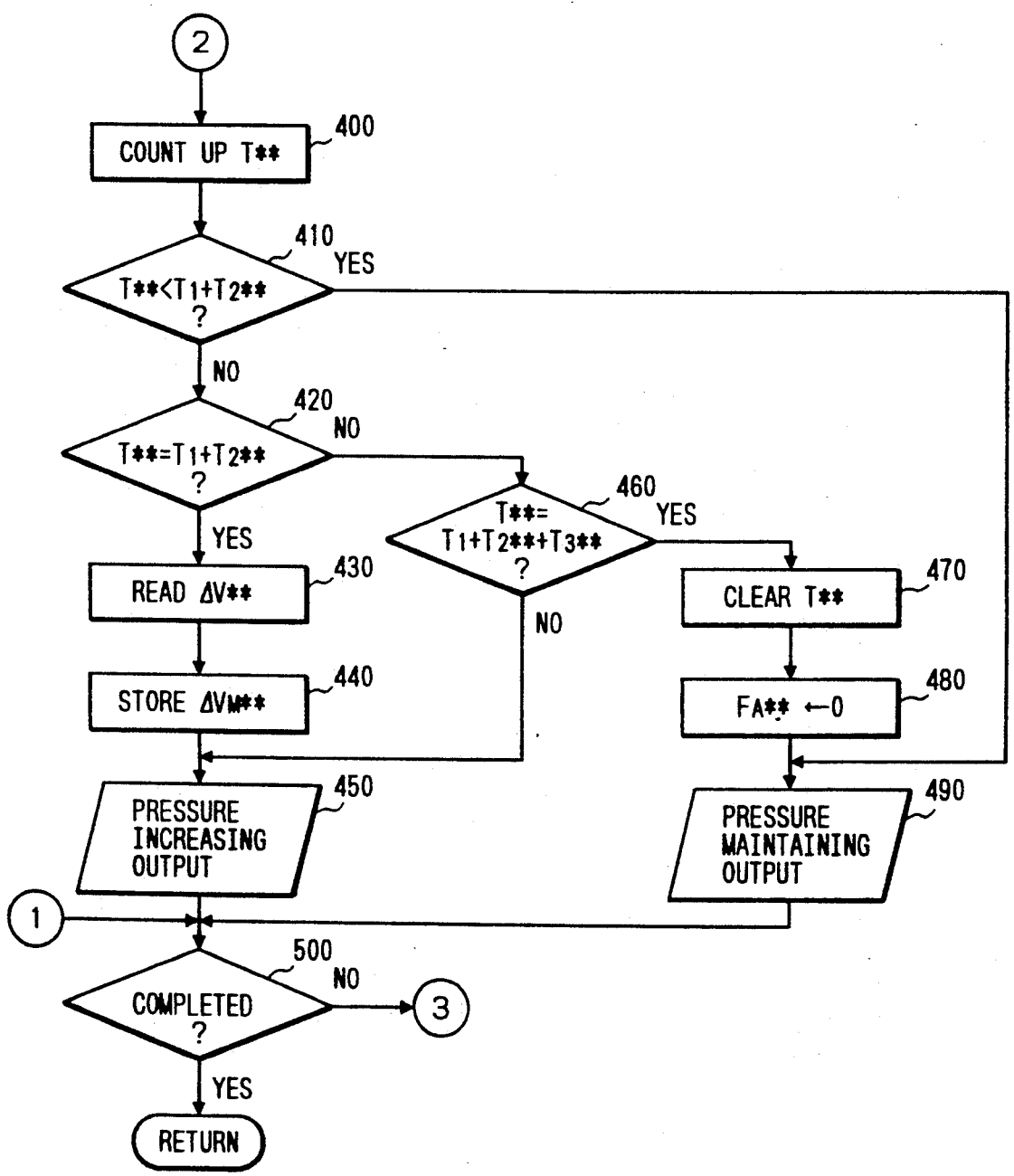

FIGS. 3 and 4 show a timer interruption routine to be executed at a predetermined interval during the execution of the above-described main routine. This interruption routine is successively executed in terms of the respective wheels in order of FR, FL, RR and RL. When the operations for the four wheels 1 to 4 have been completed, this timer interruption routine terminates.

In FIGS. 3 and 4, the control starts with a step 200 to perform the calculation operation of the wheel speeds Vw**. In this step 200 a predetermined equation is effected on the basis of the difference between the count value of the wheel speed pulses generated in the current operation and the count value of the wheel speed pulses generated in the previous operation and the time interval, and further if required, a filter process is effected, that is, an averaging process is effected which averages the wheel speeds obtained by successively performing the calculation plural times.

Further, a step 210 follows to calculate the wheel accelerations Gw**. In the step 210 a predetermined equation is effected on the basis of the difference between the speed of a wheel calculated in the step 200 of the current operation and the speed of the same wheel calculated in the step 200 in the previous operation and the calculation time interval, and if required, a process substantially similar to the aforementioned filter process is effected so as to thereby average the pulsation (ripple)

components of the wheel speed and the wheel acceleration.

The next step 211 is for determining whether the system is in the anti-skid control starting state or in the control. If the answer of the step 211 is negative, that is, if the system does not yet enter into the control or the system completes the control, the operation goes to a step 213 for a pressure-increasing output, then followed by a step 500. On the other hand, if the answer of the step 211 is affirmative, the operation advances to a step 212 to select each of the respective control modes. If selecting the pressure-decreasing mode, a step 214 follows to switch the corresponding actuator 21, 22, 23 or 24 to the pressure-decreasing position C. If selecting the pressure-maintaining mode, a step 215 follows to switch the corresponding actuator 21, 22, 23 or 24 to the pressure-maintaining position B. With these operations, the wheel braking pressure is decreased and then maintained as indicated by (c) of FIG. 9. After the executions of the steps 214 and 215, the operational flow goes to the step 500. On the other hand, if selecting the pressure-increasing mode in the step 212, a step 216 follows for the execution of the pressure-increasing mode.

The step 216 is for reading the estimation vehicle speed VB calculated in the step 110 of FIG. 2. After the execution of the step 216, a step 220 follows to calculate a deviation amount $(=V_B-Vw^{})$ between the estimation vehicle speed $V_B$ and the Wheel speed $Vw^{}$. Here, in the case that a wheel slip or the like occurs so that the wheel speed $Vw^{}$ becomes higher than the estimation vehicle speed $V_B$ and hence the deviation amount $(=V_B-Vw^{})$ becomes a minus value, the deviation amount $(=V_B-Vw^{})$ is set to 0. In the next step 230 the deviation amount $(=V_B-Vw^{})$ between the estimation vehicle speed $V_B$ and the wheel speed $Vw^{}$ calculated in the step 220 is stored as a wheel slip amount $\Delta V^{}$ in a predetermined memory area. The variations of the estimation vehicle speed VB and the wheel speed $Vw^{}$ at the time of the execution of the anti-skid control are indicated in (b) of FIG. 8 and the variation of the wheel slip amount $\Delta V^{}$ is shown in (c) of FIG. 8.

Subsequently, a step 240 is executed in order to decide whether the calculation for obtaining the pressure-increasing grade (the ratio or rate of the pressure-increasing relative to the pressure-maintaining) of the next braking pressure is completed. For this decision, when a pressure-increasing grade calculation completion flag FA (which will be described hereinafter) is "1", the decision is made as the calculation is completed, and when the flag FA is "0", the decision is made such that the calculation is net yet completed. Here, in the case the flag FA is "1", since the next pressure-increasing grade has already been calculated, the operational flow directly goes to a step 400 without executing pressure-increasing grade calculation operation (steps 250 to 300). On the other hand, if FA="0", the operation advances to a step 250. This step 250 is provided in order to read the value of a timer counter $T^{}$. This timer counter $T^{}$ is counted up in the step 400 (which will be described hereinafter) during the execution of this routine and cleared to 0 in a step 470 (which will be described hereinafter) when each of the actuators 21 to 24 is switched from the pressure-increasing position A to the pressure-maintaining position B. That is, the value of the timer counter $T^{**}$ represents the elapsed time from the time of the previous pressure-increasing operation completion as shown in (f) of FIG. 8.

In a step 260 the value of the timer counter $T^{}$ is compared with a decision time T1. This decision time T1 is set to a time (for example, several tens ms) necessary for settling the disturbance of the wheel slip amount $\Delta V^{}$ due to the wheel vibration and the like from the time of the previous pressure-increasing completion and after the pressure-increasing completion. Accordingly, when the value of the timer counter $T^{}$ is shorter than a decision time T1, under the decision that the accurate wheel slip amount $\Delta V^{}$ is not yet detectable, the operational flow directly goes to the step 400 without executing the steps 270 to 300. On the other hand, when the value of the timer counter $T^{}$ exceeds a decision time T1, that is, when the decision is made such that the value of the timer counter $T^{}$ reaches the decision time T1, the operation advances to the step 270 for calculating the pressure-increasing grade. In the step 270 the flag FA is set to "1". That is, as shown in (e) of FIG. 8, the flag FA is set to "1" when the decision time T1 is elapsed from the time that the previous pressure-increasing operation terminates, and reset to "0" at the time that the next pressure-increasing operation terminates in a step 480 which will be described hereinafter. Furthermore, the step 280 is executed to calculate a deviation amount $d\Delta V^{}$ between the wheel slip amount $\Delta V_M^{}$ immediately before the start of the previous pressure-increasing operation which is stored in a step 440 (which will be described hereinafter) and the current wheel slip amount $\Delta V^{}$, i.e., the wheel amount at the time that the decision time T1 is elapsed from the time of the completion of the previous pressure-increasing operation. As indicated in (d) of FIG. 8, the wheel slip amount $\Delta V_M^{}$ before the previous pressure-increasing operation corresponds to the stored wheel slip amount $\Delta V^{}$ immediately before the start of the previous pressure-increasing operation. Here, as shown in (c) and (d) of FIG. 8, the possibility that the wheel slip amount $\Delta V_M^{}$ immediately before the start of the pressure-increasing operation and the wheel slip amount $\Delta V^{}$ at the time that the decision time T1 is elapsed from the completion of the same pressure-increasing operation include errors due to the wheel vibration and others caused by the pressure-increasing is extremely small. Thus, it is possible to accurately detect the variation of the wheel slipping state on the basis of the deviation amount $d\Delta V^{}$ between the wheel slip amounts $\Delta V_M^{}$ and $\Delta V^{}$ at both the times. In the case that the current wheel slip amount $\Delta V^{}$ is smaller than the wheel slip amount $\Delta V_M^{}$, the deviation $d\Delta V^{**}$ is set to 0.

Figure 5:
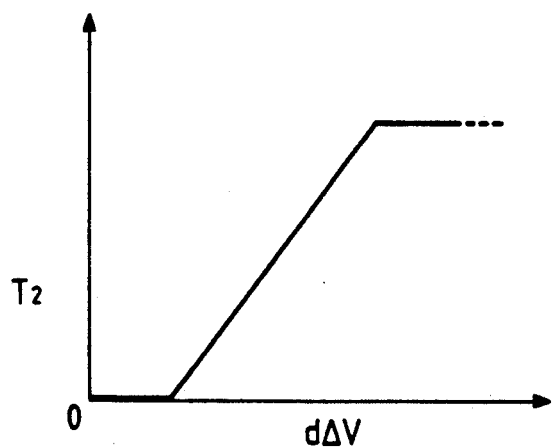
FIG. 5 is an illustration describing the relation between a wheel slip deviation amount and a holding time.
Figure 6:
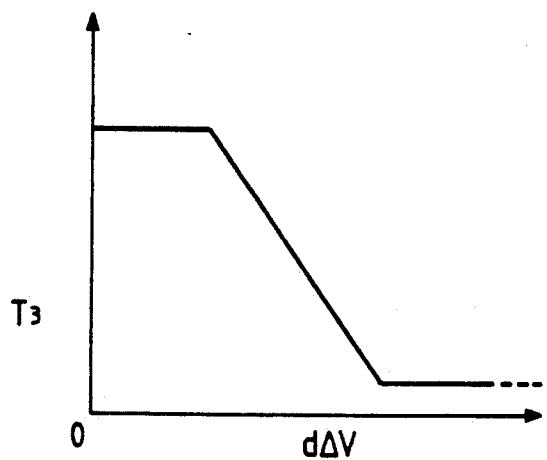
FIG. 6 is a graphic illustration describing a characteristic of a pressure-increasing time relative to a wheel slip deviation amount.

Further, the step 290 is executed to calculate a holding time T2 on the basis of the degree of the deviation $d\Delta V^{}$ calculated in the step 280. This holding time T2 is the time to be lengthened and outputted after the elapse of the decision time T1, and is set to be longer as the deviation $d\Delta V^{}$ becomes greater as shown in FIG. 5. In addition, in the step 300 a pressure-increasing time T3 to be outputted after the elapse of the decision time T1 and the elapse of the holding time T2 is calculated on the basis of the degree of the deviation $d\Delta V^{}$ calculated in the step 280. This pressure-increasing time T3 is set to be shorter as the deviation $d\Delta V^{}$ becomes greater as illustrated in FIG. 6, for example.

Figure 7:
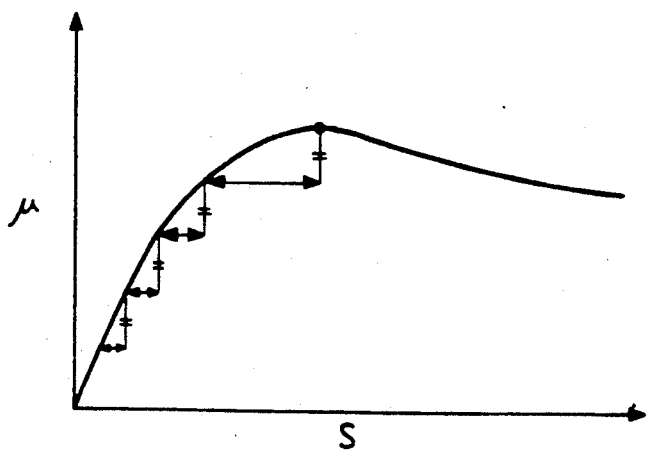
FIG. 7 illustrates the relation between a wheel slip ratio and a friction coefficient between a wheel tire and a road surface.

Here, the friction coefficient $\mu$ between a wheel tire and a road surface varies in accordance with the slip ratio s of the wheel at the time of braking, and the characteristic becomes as shown in FIG. 7. As seen from FIG. 7, when the slip ratio S of the wheel is increased to some degree (about 20%), the friction coefficient $\mu$ between the wheel tire and the road surface takes the maximum value. Further, in the anti-skid control, it is well known that the braking pressure is controlled so as to keep the friction coefficient $\mu$ to the high state to thereby improve the braking efficiency and others. Thus, according to this embodiment it is noted that the variation of the slip ratio S of the wheel relative to the variation of the hydraulic pressure becomes greater as the friction coefficient $\mu$ is brought closer to a high state (value). Moreover, in this embodiment the variation of the slip ratio S is considered to be the variation of the slip amount $\Delta V^{}$ (the deviation amount $d\Delta V^{}$), and the pressure-increasing grade is arranged to be slower as the variation of the deviation amount $d\Delta V^{}$ relative to the increase in the braking pressure due to the pressure-increasing operation become greater. That is, as shown in FIGS. 5 and 6, as the slip deviation amount $d\Delta V^{}$ becomes greater, the holding time T2 is set to be longer and the pressure-increasing time T3 is set to be shorter, thereby making small the increasing variation of the braking pressure. On the other hand, until the friction coefficient $\mu$ between the wheel tire and the road surface is close to the high value, the pressure-increasing grade is set to be rapid so as to quickly increase the braking pressure. That is, as shown in FIGS. 5 and 6, as the slip deviation amount $d\Delta V^{}$ becomes smaller, the holding time T2 is set to be shorter and the pressure-increasing time T3 is set to be longer, thereby enlarging the increasing amount of the braking pressure. Thus, according to this embodiment, it is possible that the friction coefficient $\mu$ between the wheel tire and the road surface is quickly brought close to the high state and the high friction coefficient $\mu$ state is maintained for a long time. Here, it is also appropriate that the holding time T2 and the pressure-increasing time T3 are determined in accordance with equations. Further, this embodiment is not limited to the operation that both the holding time T2 and pressure-increasing time T3 are changed in accordance with the deviation amount $d\Delta V^{}$ in the steps 290 and 300, but it is possible to fix one time and change only the other time.

After the execution of the step 300, the operational flow proceeds to the step 400 to count up the time counter $T^{}$ as described above so as to measure the time elapsed from the time of the completion of the pressure-increasing operation. Then, a step 410 is executed in order to check whether the value of the time counter $T^{}$ is shorter than the sum of the decision time T1 and the holding time T2. If the value of the time counter $T^{}$ is shorter than the sum time, the operation advances to a step 490 for outputting a pressure-maintaining signal to each of the actuators 21 to 24. On the other hand, if the value of the time counter $T^{}$ is longer than the sum time, the operation goes to a step 420. This step 420 is for checking whether the value of the time counter $T^{}$ is equal to the sum time. If both are equal to each other, since now is a timing for starting the pressure-increasing operation, a step 450 follows to output a pressure-increasing signal (command) whereby each of the actuators 21 to 24 is switched from the pressure-maintaining position B to the pressure-increasing position A. In this case, for storing the wheel slip amount of $\Delta V_M^{}$ immediately before the start of the pressure-increasing operation as described above, before the pressure-increasing signal output in the step 450, steps 430 and 440 are executed in order to read the current wheel slip amount $\Delta V^{}$ and store it as the wheel slip amount $\Delta V_M^{}$.

On the other hand, if the answer of the step 420 is negative, the operational flow goes to a step 460 to check whether the value of the time counter $T^{}$ is equal to the sum of the decision time T1, the holding time T2 and the pressure-increasing time T3, i.e., check the timing for terminating the pressure-increasing signal output. If the value of the time counter $T^{}$ is shorter than the sum time of the three times T1 to T3, it is not considered to be the timing for terminating the pressure-increasing signal output and hence the step 450 is executed to continue the pressure-increasing signal output. If the value of the time counter $T^{}$ is equal to the sum time in the step 460, it is considered to be the timing for terminating the pressure-increasing signal output, and hence the control toes to a step 470 to clear the value of the timer counter $T^{}$ to 0 so that the timer counter $T^{**}$ newly starts the counting operation from the time of the completion of the pressure-increasing operation, then followed by a step 480 to reset the flag FA to "0" to enter into the preparation for the next pressure-increasing grade calculation. In a step 490 a pressure-increasing command is outputted to each of the actuators 21 to 24.

The step 500 is provided for checking whether the control signals are outputted to the actuators 21 to 24 for all the wheels 1 to 4. If not yet outputted to the actuators 21 to 24 for all the wheels 1 to 4, the operational flow returns to the above-mentioned step 200 to repeatedly perform this routine. On the other hand, if outputted thereto, this routine terminates.

FIG. 9 shows one example of the braking pressure increasing control operation according to this embodiment. As illustrated in (a) to (c) of FIG. 9, the variation of the wheel slip amount $\Delta V^{}$ (the deviation amount $d\Delta V^{}$) is small immediately after the switching to the pressure-increasing mode, the holding time T2 is set to be short and the pressure-increasing time T3 is set to be long. As a result, the pressure-increasing grade becomes great so that the braking pressure for the wheel is quickly increased. When the variation of the wheel slip amount $\Delta V^{}$ (the deviation amount $d\Delta V^{}$) in relation to the increasing variation of the braking pressure becomes great because the friction coefficient $\mu$ between the wheel tire and the road surface becomes high, the holding time T2 is lengthened and the pressure-increasing time T3 is shortened so as to make slow the braking pressure increasing grade.

Figures 10A, 10B, 10C:
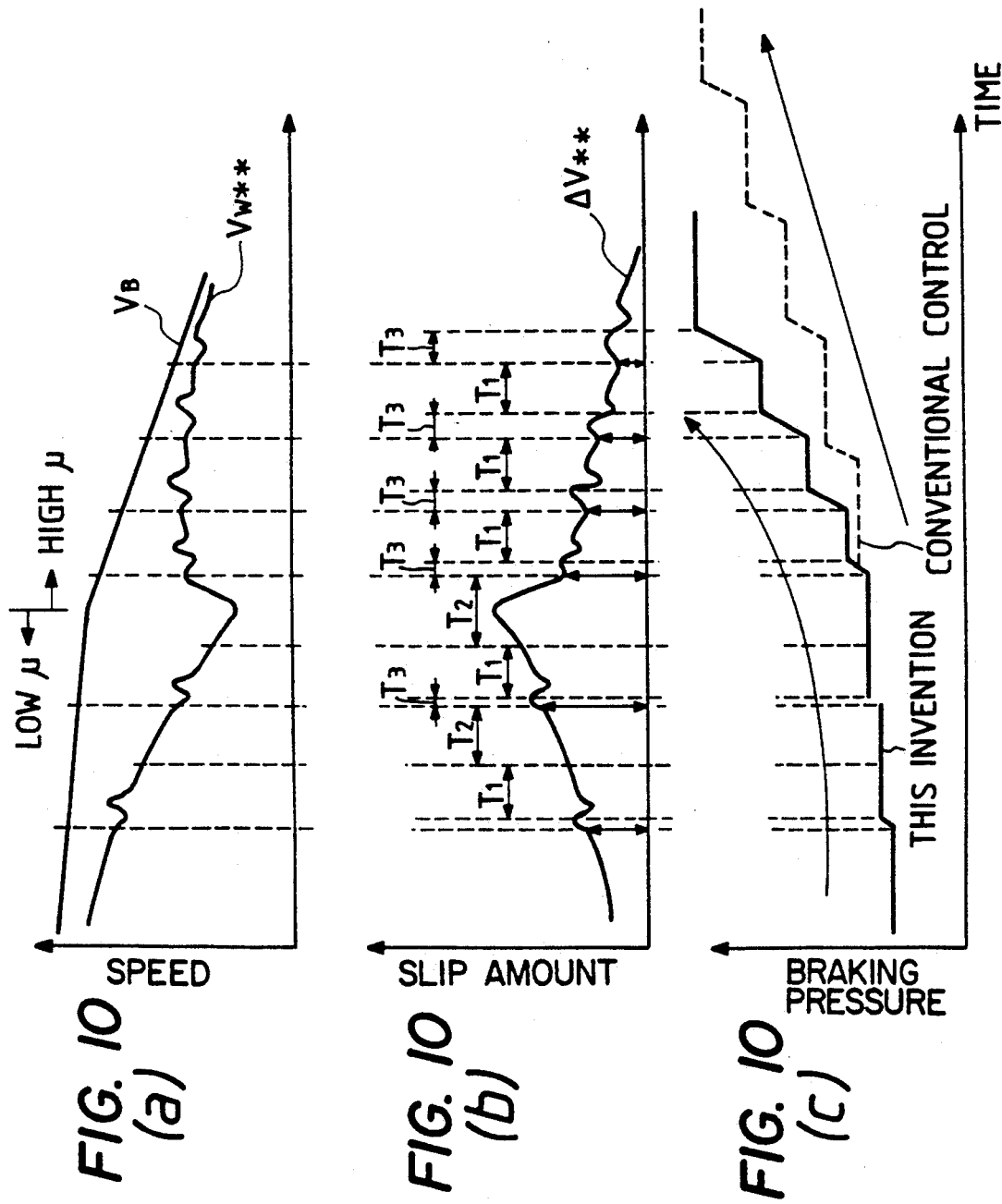

FIG. 10 shows one example of the control in this embodiment in the case that the motor vehicle moves from a road surface having a low friction coefficient (low $\mu$ road surface) to a road surface having a high friction coefficient (high $\mu$ road surface) when the system is in the operation for performing the increasing control of the braking pressure. In this case, the braking pressure (appropriate braking pressure) for keeping the wheel slip ratio to an appropriate value on the high $\mu$ road surface is extremely higher as compared with an appropriate braking pressure on the low $\mu$ road surface. Thus, the wheel slip amount $\Delta V^{}$ decreases and the deviation amount $d\Delta V^{}$ which is the variation of the wheel slip amount $\Delta V^{}$ becomes a minus value. As a result, the deviation amount $d\Delta V^{}$ is set to 0 and hence the holding time T2 is set to the minimum value (T2=0) and the pressure-increasing time T3 is set to the maximum value. Accordingly, in the case that the motor vehicle shifts from the low μ road surface to the high μ road surface, the pressure-increasing grade becomes great to quickly increase the wheel braking pressure up to the appropriate braking pressure. Thus, the braking pressure increasing control of this embodiment can offer a great effect in the case of shifting from the low μ road surface to the high μ road surface. Here, although in the above description the wheel slipping state is determined on the basis of the wheel slip amount ΔV which is the deviation between the estimation vehicle speed VB and the wheel speed V, it is appropriate to use the slip ratio which is the rate of the wheel speed V** relative to the estimation vehicle speed VB.

According to this embodiment, as the variation of the wheel slipping state becomes greater, the ratio of the pressure-increasing operation relative to the pressure-maintaining operation is set to be smaller, thereby keeping that state for a long time. In addition, the wheel slipping state is detected at the time that the possibility that errors appear due the variation of the wheel speed is less, and therefore it is possible to quickly increase the braking pressure to an appropriate value by changing the ratio of the pressure-increasing operation relative to the pressure-maintaining operation in accordance with the variation of the detected wheel slipping state.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An anti-skid control system for use in a motor vehicle which controls a braking pressure for a wheel of said motor vehicle to keep a slip of said wheel to an appropriate state, said system being arranged to increase said braking pressure by alternately performing a pressure-increasing operation and a pressure-maintaining operation in accordance with a slipping state of said wheel, said system comprising:

wheel speed detecting means for detecting a speed of said wheel;
   vehicle speed detecting means for detecting a speed of said motor vehicle;
   first detecting means for detecting a slipping state of said wheel before performing said pressure-increasing operation on the basis of the detected vehicle speed and the detected wheel speed and for storing the detected wheel slipping state;
   second detecting means for detecting a slipping state of said wheel when a predetermined time period is elapsed from said pressure-increasing operation in a state that said braking pressure is maintained after the completion of said pressure-increasing operation, said predetermined time period corresponding to an amount of time sufficient to allow disturbances in said wheel resulting from a completion of the pressure-increasing operation to settle;
   calculation means for calculating a variation of said slipping state of said wheel on the basis of the detection results of said first and second detecting means;
   adjusting means for adjusting a ratio of a time period for said pressure-increasing operation to a time period for said pressure-maintaining operation so that said ratio becomes smaller as said variation of said slipping state calculated by said calculation means becomes greater; and
   pressure-increasing means for alternately performing said pressure-increasing operation and said pressure-maintaining operation in the ratio adjusted by said adjusting means so as to increase said braking pressure for said wheel.

2. A system as claimed in claim 1, wherein said adjusting means makes greater said ratio of the time period for said pressure-increasing operation to the time period for said pressure-maintaining operation as said variation of said slipping state of said wheel calculated by said calculation means becomes smaller.

3. A system as claimed in claim 1, wherein said slipping states of said wheel to be detected by said first and second detecting means are detected on the basis of a speed difference between the detected wheel speed and the detected vehicle speed.

4. A system as claimed in claim 1, wherein said slipping states of said wheel to be detected by said first and second detecting means are detected on the basis of a slip ratio of the detected wheel speed relative to the detected vehicle speed.

5. A system as claimed in claim 1, wherein said adjusting means makes smaller said ratio of the time period for said pressure-increasing operation to the time period for said pressure-maintaining operation by effecting at least one of making shorter the time period for said pressure-increasing operation and making longer the time for said pressure-maintaining operation.

* * * * *